United States Patent [19]

Reinink

[11] Patent Number: 5,223,552
[45] Date of Patent: Jun. 29, 1993

[54] TREATMENT OF PROCESS AIR STREAM FROM RAPID COOLING OF POLYURETHANE FOAM

[75] Inventor: Edwin E. Reinink, Highlands, N.J.
[73] Assignee: PMC, Inc., Sun Valley, Calif.
[21] Appl. No.: 894,818
[22] Filed: Jun. 8, 1992
[51] Int. Cl.⁵ .............................................. C08G 18/00
[52] U.S. Cl. .................... 521/170; 521/155; 521/917
[58] Field of Search ........................ 521/155, 170, 917

[56] References Cited

U.S. PATENT DOCUMENTS

| | | | |
|---|---|---|---|
| 3,061,885 | 11/1962 | Rogers et al. | 264/50 |
| 3,890,414 | 6/1975 | Ricciardi | 264/45.1 |
| 4,537,912 | 8/1985 | Griswold | 521/53 |
| 4,649,162 | 3/1987 | Roche et al. | 521/133 |
| 4,764,536 | 4/1988 | Proska et al. | 521/133 |

FOREIGN PATENT DOCUMENTS

| | | |
|---|---|---|
| 234212 | 6/1961 | Australia . |
| 1918212 | 11/1970 | Fed. Rep. of Germany . |
| 2910798 | 2/1981 | Fed. Rep. of Germany . |

Primary Examiner—Morton Foelak
Attorney, Agent, or Firm—Davis Hoxie Faithfull & Hapgood

[57] ABSTRACT

A method and apparatus for the continuous production of flexible open cell polyurethane foam, where a process air stream is drawn through the interior of the foam material after it has completed its rise to thereby accelerate the cooling of the foam material. The process air stream contains vaporized constituents which are removed by the steps of:

(a) collecting the air stream from the foam material;
(b) passing the air stream into an adsorption expansion chamber having a cross-sectional area adapted to reduce the flow rate of the air stream;
(c) passing the air stream into an adsorption chamber;
(d) passing the air stream through at least one activated carbon char filter bed located in the chamber at a flow rate that is adapted to provide sufficient residence time for the removal of the vaporized constituents drawn from the foam material; and
(e) discharging the treated air stream into the atmosphere.

29 Claims, 2 Drawing Sheets

TREATMENT OF PROCESS AIR STREAM FROM RAPID COOLING OF POLYURETHANE FOAM

FIELD OF THE INVENTION

This invention relates to the continuous production of polyurethane foam material and the removal of environmentally undesirable constituents from process air streams that have been used in the process of rapidly cooling open cell flexible polyurethane foam prior to the discharge of the air stream into the atmosphere.

BACKGROUND OF THE INVENTION

The art of polyurethane foam manufacture, and specifically the continuous production of open cell flexible polyurethane foam, is well developed. The use of organic blowing agents such as chlorofluorocarbons and methylene chloride were adopted by the industry long prior to the determination that the uncontrolled release of these compounds into the atmosphere might have a deleterious effect on the environment.

In recent years, governmental regulations have been adopted to restrict, or even ban, the industrial use of these and other organic compounds, where the risk of environmental damage or health hazards is believed to be significant. For example, the use of methylene chloride, a relatively inexpensive auxiliary blowing agent for use in the manufacture of flexible polyurethane foam has been restricted in several states. Worldwide efforts have been undertaken to curtail the release of chlorofluorocarbons into the atmosphere, and their use in the manufacture of flexible polyurethane foam in the United States is to be eliminated entirely by the end of 1992.

It is well known that flexible polyurethane foam can be produced without the use of auxiliary organic blowing agents. Sufficient gases can be generated to cause the foam to form the desired cellular structure by increasing the water content and the amount of reactive isocyanate groups in the composition. However, a foam formulation comprising water as the sole blowing agent produces a high exotherm during the reaction which can lead to scorching, or even ignition, of the foam material in the interior of the block. The use of auxiliary blowing agents, in fact, serves to reduce the tendency for scorching. The heat required to vaporize the organic blowing agent reduces the maximum temperature of the exotherm; and any residual organic blowing agent retained in the interior of the foam block, not being flammable, would not support combustion.

In order to produce flexible polyurethane foam of acceptable quality having a cross-section of from about 72 inches to 94 inches in width and 30 inches to 50 inches high using water as the sole blowing agent, it has been found desirable to rapidly cool the interior of the freshly produced foam material by drawing an air stream through the open cell foam material after the reaction has produced a stable configuration. Various methods and apparatus for rapidly cooling the foam are known to the art and do not constitute a part of the present invention.

Examples of prior art methods and apparatus for rapidly cooling newly produced open celled flexible polyurethane foam are disclosed in the following patents: U.S. Pat. No. 3,061,885 issued Nov. 6, 1962; U.S. Pat. No. 3,890,414 issued Jun. 17, 1975; U.S. Pat. No. 4,537,912 issued Aug. 27, 1985; and allowed co-pending application Ser. No. 07/674,438 filed Mar. 22, 1991 (U.S. Pat. No. 5,128,379, issued Jul. 7, 1992).

As the air stream passes through the interior of the hot foam material and into the process air stream collection system, it removes and carries with it solid particulate matter, carbon dioxide produced by the reaction and volatile and vaporized organic constituents, including blowing agents if any were used. Under the current regulatory requirements of most jurisdictions, the heated process air stream cannot be released directly into the atmosphere.

The vaporized constituents can include small amounts of unreacted isocyanates, stabilizers, antioxidants, organic blowing agents such as chlorofluorocarbons, fluorocarbons, hydrochlorofluorocarbons, methylene chloride, acetone and 1,1,1-trichloroethane, as well as trace volatile impurities from raw materials.

Solid particulate matter drawn from the freshly produced foam can include solid chemical constituents such as butylated hydroxylated toluene ("BHT") (an antioxidant), as well as loose pieces of foam debris that cling to, or are only partially detached from the foam block when the protecting webs of paper or polymer film are stripped from the bottom, side surfaces and/or top of the foam block after it leaves the casting conveyor in order to provide air permeable surfaces. Although not harmful to the macro-environment, the bits and pieces of foam debris would create a local nuisance and maintenance problem if discharged into the atmosphere. Solid chemical constituents, such as BHT, can be eliminated by reformulating the composition of the raw materials used to produce the foam.

In allowed co-pending FWC U.S. patent application Ser. No. 07/702,413, filed May 20, 1991(U.S. Pat. No. 5,123,936, issued Jun. 20, 1992) a method and apparatus is disclosed for the downstream treatment of a process air stream from the rapid cooling of flexible polyurethane foam that employs a water spray of fine droplets and a water-wetted mechanical filtration system to reduce impurities.

SUMMARY OF THE INVENTION

In accordance with the method and apparatus of the present invention, it has been found that the process air stream resulting from the rapid cooling of polyurethane foam can be treated efficiently and economically to effectively remove the solid particulate matter and vaporized constituents so that the remaining process air stream meets current regulatory requirements for discharge of the treated air stream into the environment. The invention can be employed in connection with the continuous or batch type rapid cooling of foam blocks.

In its broadest embodiment, the improved method of the invention comprises the steps of:
  (a) collecting the hot process air stream from the rapid cooling of open cell polyurethane foam containing vaporized chemical constituents from the interior of the foam material, which air stream is substantially free of particulate matter;
  (b) passing the process air stream into an expansion chamber having a cross-sectional area adapted to reduce the flow rate of the process air stream;
  (c) passing the process air stream through an adsorption zone that contains at least one activated carbon char treatment bed that is adapted to remove substantially all of the vaporized chemical constituents from the process air stream; and (d) discharging the treated process air stream into the atmosphere.

The removal of solid foam debris has been found necessary in order to insure efficient operation of the activated carbon char beds in the adsorption zone and avoid clogging and attendant maintenance problems, and to provide for the efficient regeneration of the spent carbon char.

In another preferred embodiment the improved method comprises the steps of:

(a) collecting the proces air stream containing particulate matter and vaporized constituents from the interior of the foam material;

(b) introducing the proces air stream through an inlet in the upstream end of a filter chamber having a cross-sectional area that is adapted to reduce the flow rate of the process air stream to about 300 to 900 linear fpm;

(c) passing the process air stream through a plurality of low resistance mechanical filter elements positioned in the filter chamber to thereby entrain and remove from the process air stream particulate matter;

(d) passing the process air stream through an outlet in the downstream end of the filter chamber;

(e) passing the process air stream through an expansion chamber having a cross-sectional area adapted to reduce the air flow rate;

(f) introducing the process air stream through an upstream inlet into a chemical adsorption zone comprising at least one activated carbon char filter bed;

(g) passing the process air stream through the at least one activated carbon char filter bed at a flow rate adapted to permit removal from the process air stream of the vaporized constituents drawn from the foam material; and (h) discharging the treated process air stream through a downstream outlet on the absorption chamber into the atmosphere.

In another embodiment the improved apparatus of the invention for treating a process air stream from the rapid cooling of polyurethane before discharging the air stream into the atmosphere comprises the following elements:

(a) process air stream collection conduit means for transporting the process air stream;

(b) a filter chamber provided with an inlet and an outlet, and having a cross-sectional area in the direction of flow adapted to minimize the pressure drop of the process air stream across the filter chamber;

(c) a plurality of mechanical filter elements mounted on the interior of the filter chamber;

(d) an adsorption expansion chamber adapted to receive the process air stream exiting from the outlet of the filter chamber and having a cross-sectional area in the direction of flow adapted to minimize the pressure drop of the air stream discharged into the atmosphere;

(e) an adsorption chamber having an inlet adapted to receive the process air stream following its passage through the expansion chamber and an outlet for discharging the process air stream to the atmosphere; and (f) at least one activated char carbon filter bed positioned on the interior of the adsorption chamber between the chamber inlet and the outlet.

In a preferred embodiment, the improved process of the invention includes the initial step of passing the process air stream containing particulate matter and vaporized chemical constituents from the rapid cooling treatment zone through a mechanical filter treatment zone to remove the particulate matter from the process air stream.

In a further preferred embodiment the mechanical filter treatment zone includes a pre-filter expansion chamber adapted to reduce the velocity of the process air stream prior to its passage through the mechanical filters.

The pre-filter expansion chamber can advantageously be combined with a plurality of mechanical filters in the construction of a filter chamber having at least one, but preferably a plurality of filter elements positioned transverse to the direction of flow of the hot process air stream. These filter elements should have a large effective surface area, the ability to prevent passage of relatively fine particles and which do produce a significant back pressure, or pressure drop across the filter chamber. The filter element, or medium must also have sufficient tensile and tear strength to withstand the force of the process air stream and the impact of the particulate material. A suitable filter medium for use in the process is open cell polymer foam. The polymer foam mechanical filters can be open cell polyurethane foam, having either a flat or convoluted upstream surface. Use of convoluted foam provides a larger surface area, produces a relatively low pressure drop, and permits more efficient particulate removal over longer operating times, thereby lowering the maintenance and/or changing of the filters. The production of convoluted foam is well known in the art.

The filter chamber is constructed to permit easy access to the one or more filter trays on which the filter media are retained and supported, as by metal hardware cloth or cross members. A door or manhole serving this purpose should be provided with gaskets to preclude the escape of the pressurized hot process air stream from the filter chamber. If it is necessary to provide for the continuous operation of the rapid cooling process for a time exceeding the useful life or capacity of the filters, two filter chambers can be constructed with appropriate ductwork and diverter baffles to permit the process air stream to be diverted from one chamber to the other when filter replacement or reconditioning become necessary. Alternatively, a foam web of indefinite length having a flat or convoluted surface can be provided to the filter chamber and continuously or periodically advanced to provide a fresh surface for retaining particulate matter.

The chemical adsorption zone is comprised of at least one bed of activated carbon char, or activated charcoal through which the process air stream passes prior to being discharged into the atmosphere. The design, capacity and configuration of the apparatus containing the activated carbon char ("ACC") beds is based on a number of factors, including: (1) volumetric air flow; (2) the linear velocity of the air flow; (3) the concentration or weight of vaporized constituents to be removed from the process air stream; (4) the ambient temperature; (5) the temperature of the incoming process air stream; and (6) duration of the operation adsorption unit.

The ACC used is of the type produced from the destructive distillation of nut sheets, wood, animal bones and other carbonaceous materials. The highly porous ACC obtained from coconut shells has been found to perform satisfactorily in the process of the invention.

If the volume of the process air streams and concentration of volatiles is relatively low, and the practice of the process intermittent, a single stage adsorption bed can be sufficient. For large scale continuous foam production facilities where the rapid cooling process may continue for two, or even three shifts, it has been found desirable to employ an adsorption chamber which comprises an expansion chamber to reduce the linear velocity of the process air stream to provide an air flow of about 35 to 75 linear fpm. as it passes through the ACC in the adsorption unit. In one preferred embodiment, the process air stream is divided into two parallel streams which each pass through a scavenger bed and a primary bed. Continuous monitoring by conventional means for volatile organics downstream of the adsorption unit is employed to indicate the effectiveness of the ACC beds in removing these constituents.

The ACC in the primary bed(s) can be sampled and tested periodically to determine its continued capacity to adsorb chemical constituents. The efficient and cost-effective operation of the adsorption unit can be enhanced by providing for the individual replacement of the ACC in one or more of the beds making up the unit. The design parameters for the adsorption unit and methods for reconstituting spent ACC are known in the art.

It has been found that during start-up, before the ducts and the adsorption unit and filter beds reach a stable operating temperature, which is in excess of about 200° F., that a small percent of the chemical constituents pass through the adsorption unit with the process air stream. It is estimated that less than 10% of the constituents are not adsorbed during the first two to five minutes of operation. This start up phenomenon can be avoided by preheating the adsorption unit with heated air before the rapid cooling process air stream is treated. The filter beds can be heated to about 180° F. to 230° F.

The efficient operation of the adsorption unit is also affected by the temperature of the incoming process air stream and the presence of moisture in the air stream. The adsorption capacity of the ACC is inversely proportional to the temperature, i.e., the higher the temperature the lower the capability for removing volatiles from the air stream. The presence of moisture is also deleterious to the ACC.

Where ambient temperatures are relatively high as a result of the local climate, the process air stream can be passed through appropriate heat exchangers to reduce the temperature. A heat exchanger can advantageously be installed at any convenient location upstream of the adsorption unit to recover excess heat values for use in other plant processes or for heating of worker areas when required by climatic conditions.

Excessive water vapor can also be removed upstream of the adsorption unit, if desired. If water spray is used in the process to enhance the rapid cooling of the foam block, the water vapor can be removed from the process air stream prior to the contact with the adsorption bed in order to avoid premature deactivation of the ACC in the adsorption unit. Higher operating temperatures in the adsorption can also eliminate any water vapor introduced by the process air stream.

DETAILED DESCRIPTION OF THE INVENTION

Figure 1:
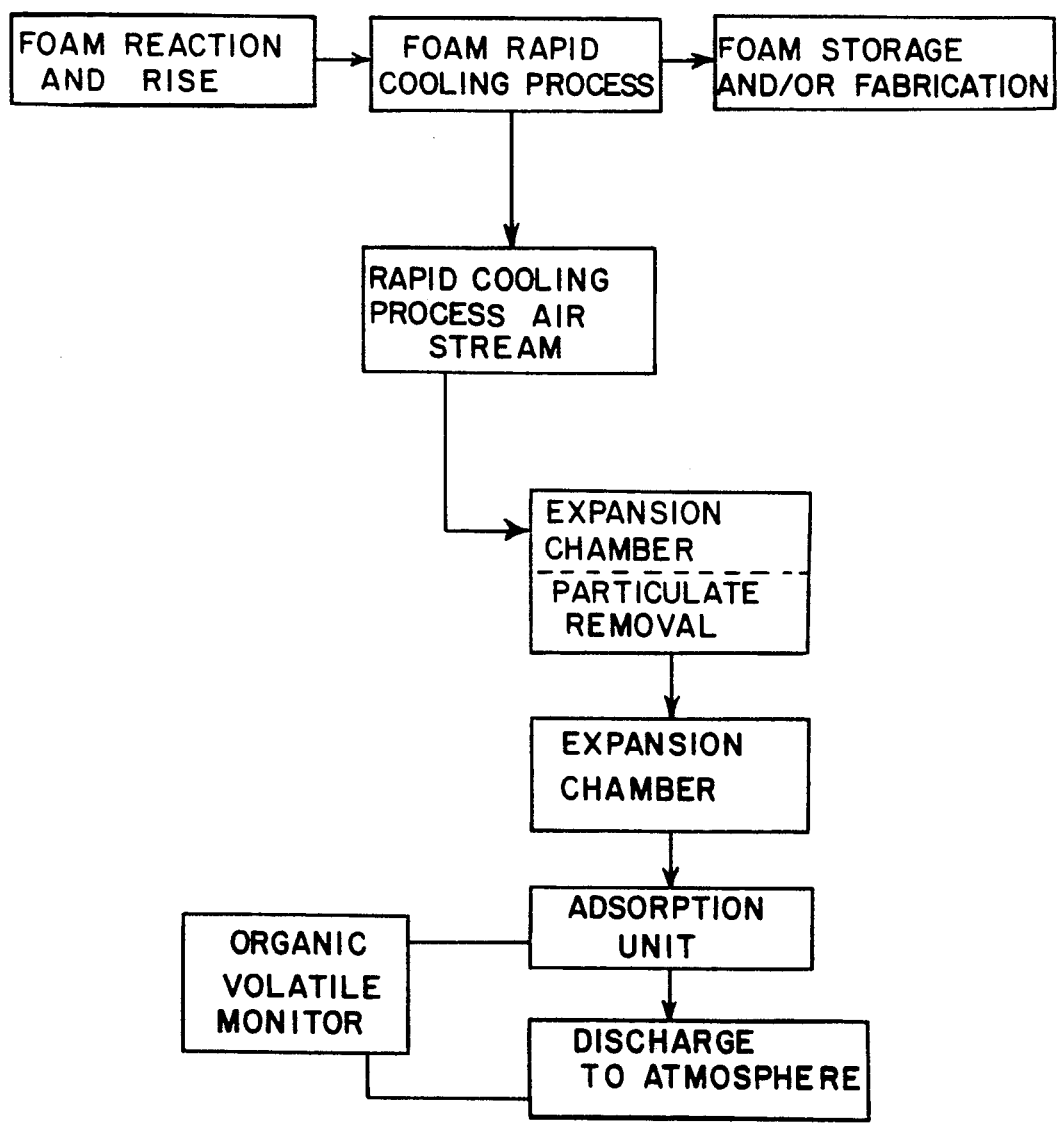
FIG. 1 is a schematic block diagram of the improved process of the invention for treating the rapid cooling process air stream as applied to a typical flexible polyurethane foam manufacturing process.

The invention will be further described with reference to the drawings in which FIG. 1 illustrates by a schematic block diagram a typical continuous flexible polyurethane foam production method employing the rapid cooling process for treating the foam after it has completed its rise. Following rapid cooling, the continuous foam block is cut into desired lengths so that it can be warehoused for eventual shipment, or fabricated into other articles.

In accordance with the method of the invention, the rapid cooling process air stream is collected from the rapid process treatment zone by means of appropriate duct work in which the air stream is traveling at a flow rate of from 1500 cubic feet/minute ("cfm") to 2500 cfm, or even up to a flow rate as high as 8,000 to 15,000 cfm. The flow rate of the process air stream is determined by the design parameters of the foam cooling apparatus, size and type of foam being treated and other variables that will be obvious to one of ordinary skill in the art.

The high speed process air stream is introduced into a prefilter expansion chamber having a sufficient cross-sectional area to reduce the velocity to less than 1000 fpm, and preferably to a velocity of from about 300 to 900 linear fpm.

The next step in the method is to remove from the process air stream particulate matter, such as foam debris drawn from the surface of the foam block by the high velocity rapid cooling air stream. This particulate removal step can be accomplished by passing the process air stream through a mechanical filter medium, such as a woven or nonwoven fiber, a metal mesh, fiberglass or other porous filter that will produce a minimum back pressure, or pressure drop across the particulate filter. Effective filtering of foam debris can be accomplished using a plurality of polymer foam filters comprising open cell polyurethane foam. Efficient removal of particulate matter can be accomplished using as a first filter element 30 pore/inch ("ppi") filter foam having a convoluted upstream surface and a thickness of 2 inches; and a second flat filter element of 70–80 ppi filter foam with a convoluted surface and a thickness of one inch. Other combinations of porosity and foam thickness can be employed in order to obtain effective and efficient removal of solid particulates with a minimum of pressure drop.

Following treatment to remove the solid particulate matter, the process air stream is passed into an adsorption expansion chamber having a cross-sectional area adapted to reduce the velocity of the air stream. Downstream of this expansion zone is the adsorption chamber containing at least one activated carbon char ("ACC") filter bed through which the process air stream is passed at a flow rate of from about 35 to 75 linear fpm to remove the vaporized chemical constituents from the air stream. The flow rate of the process air through the ACC filter bed can vary in accordance with the design parameters of the filter bed. The design of the bed is selected to minimize the pressure drop of the process air stream as it passes through the adsorption unit.

The final step in the process is the discharge of the treated process air stream from the adsorption chamber into the atmosphere.

Figure 2:
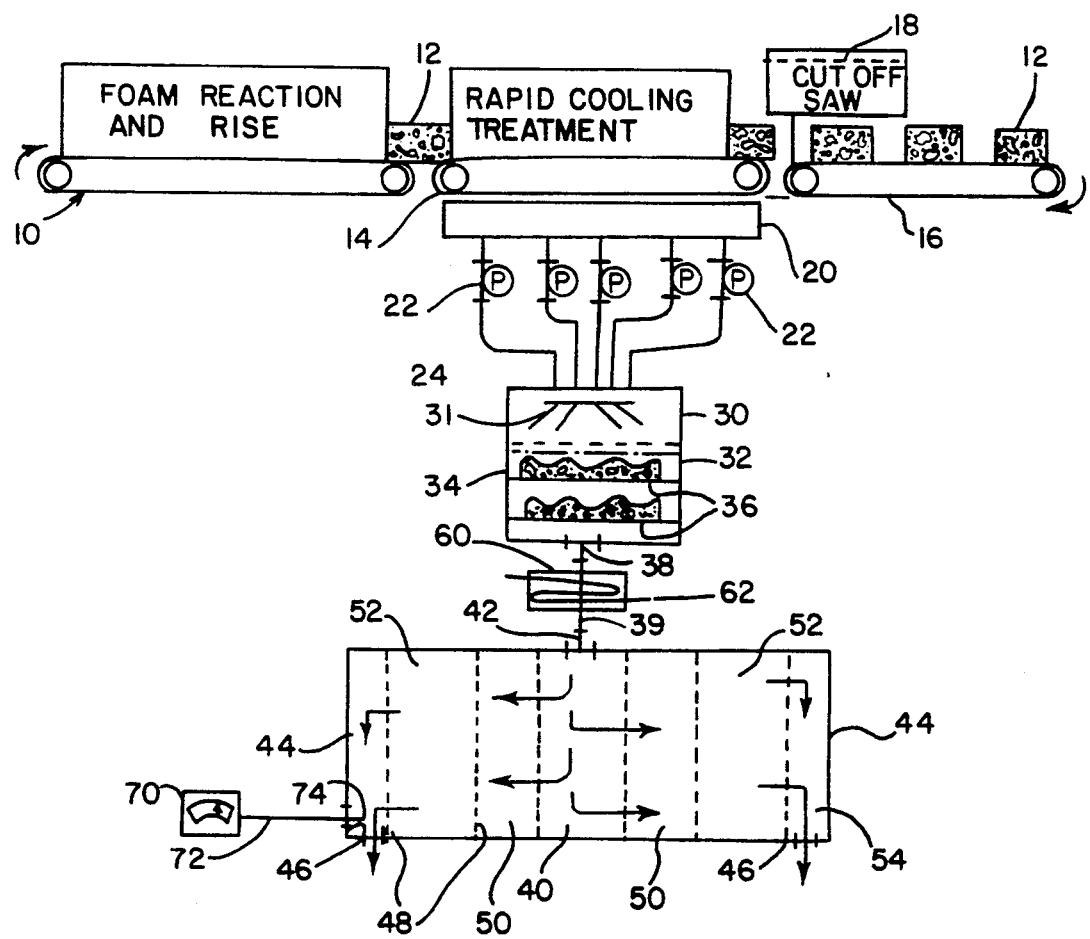
FIG. 2 is a partially schematic and cut-away diagram illustrating one embodiment of apparatus of the invention as employed in the manufacture of flexible polyurethane foam.

With reference to the apparatus illustrated in FIG. 2, there is shown a conventional foam production conveyor which is lined with one or more webs of release material such as a polyethylene film. As the continuous foam block 12 completes its rise and reaches a self-sustaining configuration, it is transferred to the air permeable conveyor system 14 where the foam is subjected to the rapid cooling treatment.

In order to permit the cooling air to be drawn through the freshly produced open cell foam material, the impervious skin which forms on the external surfaces of at least the top and bottom of the foam block or bun must be removed or perforated. After the foam has completed its rise and attained a self-sustaining state, the bottom and side conveyor liner webs are removed in the conventional manner. If the impervious skin is not completely removed with the liner webs, the bottom, and optionally the sides, of the block are either trimmed to exposed open cell foam or provided with a plurality of longitudinal cuts to permit the free passage of air. Optionally, the top skin can also be removed, or cut.

The rapid cooling process air stream, which has been drawn through the foam material, passes through the open mesh surface of conveyor 14 into collection box 20 which is connected by conventional duct 24 work to vacuum air pumps 22.

One or more collection conduits 24 downstream of the pumps 22 conduct the process air stream to the inlet of pre-filter expansion chamber 30. Expansion chamber 30 is adapted to reduce the velocity of the process air stream to less than 1000 fpm, and preferably from about 300 fpm to 900 fpm as it passes through the mechanical filters. Chamber 30 can advantageously be constructed as part of filter chamber 32.

Filter chamber 32 contains a plurality of trays or supports 34 on which open cell polyurethane foam filters 36 are positioned across the air flow. The filters 36 and supports 34 are adapted to permit easy removal and replacement of the filters, as through a door or manhole having appropriate air seals. The configuration of the filter chamber and selection of filter media is adapted to minimize the pressure drop across the filter chamber.

The filtered process air stream exits filter chamber 32 through outlet 38 into communicating conduit 39 which directs the air stream into the adsorption expansion chamber 40 through inlet 42.

Adsorption expansion chamber 40 is adapted to further reduce the velocity of the process air stream prior to its passage into the one or more adsorption units 44 where chemical constituents are removed from the air stream.

Adsorption unit 44 is comprised of at least one filter bed 50 communicating with expansion chamber 40. In the preferred embodiment illustrated in FIG. 2, adsorption unit 44 is comprised of a pair of filter beds that operate in parallel and through which the process air stream passes in separate streams, each side containing a guard or sacrificial bed 50 and a primary bed 52. The beds are filled with activated carbon char, and the structure is adapted to permit the easy removal of spent carbon from one or more of the individual beds and its replacement with fresh material. The design capacity of the adsorption unit is correlated to the volume of the process air stream discharged from the vacuum pumps 22, and the concentration of the chemical constituents in the air stream.

As will be apparent to one of ordinary skill in the art, the design and configuration of the adsorption unit and adsorption expansion chamber can be modified in a number of ways, including the incorporation of the expansion chamber 40 into the head space above a single or plurality of sequential filter beds rather than the parallel filter beds illustrated in FIG. 2.

The fully treated process air stream exits the filter bed into exhaust passage 54 and is discharged through outlet 46 to the atmosphere.

A monitor 70 is optionally connected by appropriate circuitry and/or tubing to sampling probe 74 which is located adjacent the discharge outlet 46 and in the path of the completely treated process air stream. The monitor 70 is adapted to analyze the process air stream for chemical constituents, and in the event of the detection of material in excess of predetermined limits will sound an alarm or provide other appropriate signals to operating personnel to indicate that the ACC requires maintenance.

In the event that the temperature of the process air stream exceeds an efficient operating temperature for the carbon beds in adsorption unit 44, an optional heat exchanger 60 with appropriate heat transfer medium conduit 62 can be inserted into the process air duct or conduit, for example, in conduit 39, in order to reduce the temperature of the air stream in advance of the adsorption unit 44. As will be apparent to one of ordinary skill in the art, the heat transfer unit 60 can be inserted at other positions in the apparatus, for example, in pre-filter expansion chamber 30 or adsorption expansion chamber 40.

If water is used to enhance the rapid cooling of the foam, or if ambient high humidity conditions have a deleterious effect on the operation of the ACC beds in unit 44, an optional water knock-out unit (not shown) can be inserted in the process air duct or conduit to treat the process air stream prior to its contact with the ACC filter beds. A combined heat exchanger and water knock-out device of conventional design can be advantageously employed as required by the ambient and/or operating conditions of the rapid cooling process.

EXAMPLE

In the following example, an apparatus similar to that illustrated in FIG. 2 is employed to remove particulate and chemical constituents from a process air stream generated in the rapid cooling of continuously produced, open cell flexible polyether polyurethane foam.

Following removal of the bottom and side conveyer lining webs, the continuous foam block 12 passes onto an air permeable conveyer 14 fitted with a collection box 20. Six vacuum pumps 22, each having a rated capacity of 2000 cfm, are connected to collection box 20 by steel ducts seven inches in diameter.

The output of the six vacuum pumps, constituting a combined air flow of about 12,000 cfm is introduced into pre-filter expansion chamber 30, which is fitted with deflection baffle 31 to distribute the process air stream across the filter surface. Expansion chamber 30 is constructed as part of filter chamber 32, both of which are four feet by four feet, providing a total filter area of about 16 square feet in the direction transverse to the flow of the air stream. The expansion chamber provides a head space of about two feet above the surface of the first filter tray 34.

The first filter element is a 30 ppi open cell polyurethane filter foam having a convoluted upper surface and a thickness of 2 inches; the second filter element is a two-inch thick piece of convoluted filter foam having 70-80 ppi. These filter elements remove all particulate matter from the process air stream with sufficient capacity to permit several production runs between changes.

The process air stream exits the filter chamber 32 via a 36 inch diameter steel duct and is conveyed to the adsorption expansion chamber 40, which is constructed as an integral part of adsorption unit 44. The adsorption unit contains two tandem units, each containing a scavenger then a primary bed 50 and 52. The air stream passes from the expansion chamber 40 through the filter beds at a flow rate of from 35 fpm to 75 fpm, providing a sufficient residence time on the beds to effect complete removal of the chemical constituents from the air stream.

As a result of the relatively low pressure drop across the various elements in the system, the exhaust air stream enters the adsorption unit at about 11,500 cfm, as compared to the 12,000 cfm discharged by the six vacuum pumps.

In an alternative embodiment of the process (not illustrated), the continuous foam block is cut into lengths of up to 35 feet, or more, after it has completed its rise and passed from production conveyor 10. The long foam blocks are transferred from the production area to an adjacent warehouse or storage area prior to having been subjected to the rapid cooling process. Once the block has reached the storage area, it is subjected to the rapid cooling process while in a stationary position. The rapid cooling process can be completed within a period of from about four to eight minutes, depending upon the thickness, density, air permeability, etc. of the foam block being treated. The rapid cooling process should be completed within about sixty to ninety minutes of pouring the foam composition to reduce the internal temperature of the foam block to about 120° F. The cooled block is then removed from the batch-type treatment for storage and eventual fabrication and/or shipment. In the meantime, the next long block has advanced to the vicinity of the rapid cooling equipment and is moved into position for treatment. The downstream treatment of the process air stream containing solid particulate matter and chemical constituents drawn from the interior of the foam block is the same as that described above with reference to FIG. 2.

Various modifications and variations of the method and apparatus of the invention will be apparent to those skilled in the art without departing from the spirit and scope of the invention as defined by the claims.

I claim:

1. In the method for the continuous production of flexible open cell polyurethane foam from a composition comprising a reactive isocyanate, at least one polyol resin and a blowing agent, where process air is drawn through the interior of the foam material after it has completed its rise to thereby accelerate the cooling of the foam material and the process air stream contains residual reaction by products and unreacted ingredients of the foam composition in vaporized form, the improvement which comprises the steps of:

(a) collecting the process air stream containing vaporized constituents from the interior of the foam material;
    (b) passing the process air stream into an adsorption expansion chamber having a cross-sectional area adapted to reduce the flow rate of the process air stream;
    (c) passing the process air stream into an adsorption chamber;
    (d) passing the process air stream through at least one activated carbon char filter bed located in the adsorption chamber at a flow rate that is adapted to provide sufficient residence time for the removal from the process air stream the vaporized constituents drawn from the foam material; and
    (e) discharging the treated process air stream from the absorption chamber into the atmosphere.

2. The method of claim I where the adsorption expansion chamber is integrated in the adsorption unit.

3. The method of claim 1 where the foam material is treated in a continuous process.

4. The method of claim I where the adsorption chamber contains a plurality of filter beds.

5. The method of claim 4 where the process air stream passes through the filter beds in parallel flow.

6. The method of claim I where the process air stream is passed through at least one filter bed at a velocity of from about 35 to 75 linear fpm.

7. The method of claim I which includes the step of analyzing the exhaust air stream discharged from the adsorption chamber for chemical constituents.

8. In the method for the continuous production of flexible open cell polyurethane foam from a composition comprising a reactive isocyanate, at least one polyol resin and a blowing agent, where process air is drawn through the interior of the foam material after it has completed its rise to thereby accelerate the cooling of the foam material and the process air stream contains residual reaction by products and unreacted ingredients of the foam composition in vaporized form, and solid particulate matter, the improvement which comprises the steps of:

(a) collecting the process air stream containing vaporized constituents from the interior of the foam material and particulate matter;
    (b) introducing the process air stream into a prefilter expansion chamber to thereby reduce the flow rate of the process air stream;
    (c) passing the air from the pre-filter expansion chamber into a filter chamber;
    (d) passing the process air stream through at least one mechanical filter element positioned in the filter chamber to thereby entrain and remove from the process air stream particulate matter;
    (e) passing the process air stream from the filter chamber into an adsorption expansion chamber having a cross-sectional area adapted to reduce the flow rate of the process air stream;
    (f) passing the process air stream into an adsorption chamber;
    (g) passing the process air stream through at least one activated carbon char filter bed in the adsorption chamber at a flow rate that is adapted to provide sufficient contact between the constituents and the activated carbon to thereby remove from the process air stream the vaporized constituents drawn from the foam material; and (h) discharging the treated process air stream from the adsorption chamber into the atmosphere.

9. The method of claim 8 where the flow rate of the air stream discharged from the adsorption chamber is not less than about 90 percent of the flow rate of the process air stream collected from the accelerated cooling of the foam material.

10. The method of claim 8 where the velocity of the process air stream in the pre-filter expansion chamber is from about 300 to 900 fpm.

11. The method of claim 8 where the process air stream is passed through at least one open cell polymer foam filter element.

12. The method of claim 11 where the process air stream is passed through a plurality of open cell polymer foam filter elements.

13. The method of claim 11 where the process air stream is passed through a first open cell flexible polyurethane filter foam of about 30 ppi.

14. The method of claim 13 where the upstream surface of the filter foam is convoluted.

15. The method of claim 12 where the foam is passed through an open cell flexible polyurethane filter foam of about 70 to 80 ppi.

16. The method of claim 8 where the filter beds contain activated carbon char produced from coconut shells.

17. The method of claim 8 where the process air stream passes through at least one filter bed at a velocity of from about 35 fpm to 75 fpm.

18. The method of claim 8 where the adsorption chamber contains a plurality of filter beds.

19. The method of claim 8 where the at least one filter bed is preheated by passing a heated air stream through the adsorption chamber prior to passing the process air stream through the at least one filter bed.

20. In the method for treating the process air stream obtained from the accelerated cooling of freshly produced, open cell flexible polyurethane foam, which process air stream contains vaporized constituents drawn from the interior of the foam material and particulate matter, the improvement which comprises the steps of:

(a) collecting the process air stream containing vaporized constituents from the interior of the foam material and particulate matter;

(b) introducing the process air stream into a pre-filter expansion chamber that is adapted to reduce the flow rate of the process air stream to about 300 to 900 linear fpm;

(c) passing the air from the pre-filter expansion chamber into a filter chamber;

(d) passing the process air stream through a plurality of open cell polymer foam filters positioned in the filter chamber to thereby entrain and remove the particulate matter from the process air stream;

(e) passing the process air stream from the filter chamber into an adsorption expansion chamber having a cross-sectional area adapted to reduce the flow rate of the process air stream;

(f) passing the process air stream into an adsorption chamber;

(g) passing the process air stream through at least one activated carbon char filter bed in the adsorption chamber at a flow rate of from about 35 to 75 linear fpm to thereby remove from the process air stream the vaporized constituents drawn from the foam material; and (h) discharging the treated process air stream from the adsorption chamber into the atmosphere.

21. The method of claim 20 which includes the further step of analyzing the process air stream discharged from the adsorption chamber for chemical constituents.

22. The method of claim 20 where the process air stream from the accelerated cooling of the foam is collected at a rate of from 8,000 cfm to 14,000 cfm and introduced into the prefilter expansion chamber.

23. The method of claim 20 where the pre-filter expansion chamber has the same cross-sectional area in the direction of flow as the filter chamber.

24. The method of claim 20 where the process air stream passes through a plurality of open cell flexible polyurethane foam filters positioned in the filter chamber, at least one of which filters has 30 ppi and another of which has 70 to 80 ppi.

25. The method of claim 20 where the operating temperature of the filter beds is in the range of from 180° F. to 230° F.

26. The method of claim 20 which includes the step of passing the process air stream through a heat exchanger prior to passing the air stream through the at least one filter bed.

27. The method of claim 20 which includes the further step of removing water vapor from the process air stream prior to passing the air stream through the at least one filter bed.

28. The method of claim 20 where the process air stream is divided and passes through a plurality of parallel filter beds containing activated carbon char.

29. The method of claim 28 where each of the parallel filter beds comprises at least two separable filter beds.

* * * * *